United States Patent [19]

Mudge

[11] Patent Number: 5,791,297
[45] Date of Patent: Aug. 11, 1998

[54] DOG COLLAR DESIGNED TO PREVENT ENTRAPMENT STRANGULATION OR INJURY

[76] Inventor: Mary Tenney Mudge, Rte. 3, Box 209, Lexington, Va. 24450

[21] Appl. No.: 593,741

[22] Filed: Jan. 29, 1996

[51] Int. Cl.⁶ ............................................. A01K 27/00
[52] U.S. Cl. .................... 119/865; 119/863; 119/792; 24/669; 24/702
[58] Field of Search .................................. 119/865, 863, 119/792; 24/163 K, 169, 198, 669, 702

[56] References Cited

U.S. PATENT DOCUMENTS

| | | |
|---|---|---|
| 2,612,139 | 8/1952 | Collins . |
| 3,589,341 | 6/1971 | Krebs . |
| 3,994,265 | 11/1976 | Banks . |
| 3,995,598 | 12/1976 | Gardner . |
| 4,031,859 | 6/1977 | Stewart . |
| 4,044,725 | 8/1977 | Miller . |
| 4,180,016 | 12/1979 | George . |
| 4,426,957 | 1/1984 | Horrigan . |
| 4,881,492 | 11/1989 | Jones . |
| 4,917,049 | 4/1990 | Peterson . |
| 5,322,037 | 6/1994 | Tozawa .................... 119/865 |
| 5,443,039 | 8/1995 | Suchowski ................ 119/865 |
| 5,450,820 | 9/1995 | Kirsch . |

OTHER PUBLICATIONS

Picture and Description of Break–Away Clip of ITW Nexus, Brochure p. 23, undated.

Primary Examiner—John G. Weiss
Assistant Examiner—Bruce E. Snow
Attorney, Agent, or Firm—Donavon Lee Favre

[57] ABSTRACT

A break-away clip in dog collar allows the dog to break free if the collar is caught on a protrusion or if another dog bites and twists the collar. The break away clip separates into two halves. One half contains two resilient posts and a resilient hook. The posts are separated from the hook by the width of a rod. The second half of the clip contains a rod which is forced between the two resilient posts and the resilient hook. Tension or twisting force on the collar, which is transmitted to the clip, causes the clip to open and free the dog from its collar so the dog can escape.

9 Claims, 3 Drawing Sheets

DOG COLLAR DESIGNED TO PREVENT ENTRAPMENT STRANGULATION OR INJURY

FIELD OF THE INVENTION

The present invention is directed to a break-away clip in the collar of a dog which will open if the collar is twisted or caught on a protrusion thereby preventing strangulation of the dog, injury or the dog being trapped and starving to death.

BACKGROUND OF THE INVENTION

The use of conventional pet collars presents serious hazards to the animals. Thoughtful owners remove the collars before allowing a pet to roam unattended. This presents the problem of the pet becoming unidentifiable when lost. It is also illegal for a pet to roam without a license or tag. The major problem with collars on pets is the danger of the pet getting the collar caught on a protruding object or the collar being twisted in a fight or during aggressive play. When caught on a protruding object, the pet risks strangulation or death by being trapped away from food and water. This may be the primary reason why so many pets are lost and never found. They are trapped in the wilderness by their collars. When the collar is twisted in a fight or in the pets efforts to free itself, the collar acts as a tourniquet strangling the pet or cutting off the blood supply to the brain. Many meritorious efforts have been made to solve the problem.

U.S. Pat. No. 2,612,139 Collins (1952) discloses a ball and socket closure for a cat collar. The ball and socket is designed to open at a predetermined tension. The ball is joined to the collar strap by a D ring and socket is also joined to the collar strap by a D ring. Twisting of the collar would open the ball and socket if it were not free to slide on the D rings.

U.S. Pat. No. 3,589,341 Krebs (1971) discloses a magnetic fastener for an animal collar designed to open under a predetermined load. The design of the collar is such that a twisting motion in any direction would tend to bind the fastener to some extent.

U.S. Pat. No. 3,994,265 Banks (1976) discloses a ball and socket coupling for a cat collar that can be locked to prevent the coupling from coming open. Again a twisting motion could tend to cause the coupling to bind and restrain the coupling from opening in an emergency.

U.S. Pat. No. 3,995,598 Gardner et al (1976) disclose a choke collar with a breakable link. The breakable link would have to be replaced if broken, and there is no provision for preventing the pet from straining on the leash and breaking the link during normal usage.

U.S. Pat. No. 4,031,859 Stewart (1977) discloses a collar having a releasable catch which will pull apart with sufficient tension. Again a twisting motions will tend to bind the catch. A similar catch is shown in U.S. Pat. No. 2,900,696 Bacon (1959).

U.S. Pat. No. 4,044,725 Miller (1977) discloses a ball and socket coupling for a pet collar for an animal such as a cat. The tension at which the coupling breaks can be adjusted for different sized animals. The coupling is not smooth, and when a large coupling is needed as in the case of a large dog, could exert an uncomfortable pressure on the underside of the dogs neck. The underside of the neck is quite sensitive.

U.S. Pat. No. 4,180,016 George (1976) discloses a collar having a frictional release. A flared end has a chamber to receive a free end having the same contour. It appears that a sideways force could cause some binding.

U.S. Pat. No. 4,426,957 Horrigan (1984) discloses the use of a D ring positioned on each side of a break-away coupling to prevent the coupling from opening when both D rings are attached to a leash. A hook and loop coupling is shown and others are disclosed.

U.S. Pat. No. 4,881,492 Jones (1989) discloses plug and socket members of a break-away animal collar affixed each by a screw vising. Misalignment of the plug and socket by a twisting motion would tend to bind the plug in the socket and increase the tension necessary to open the collar.

U.S. Pat. No. 4,917,049 Peterson (1990) discloses using a hook and loop fastener as a break-away coupling in a pet collar. Animal hair has a tendency to become entangle in the hook and loop fastening elements reducing the effectiveness of the break-away coupling. The use of a double D ring to override the break-away coupling is also disclosed.

U.S. Pat. No. 5,443,039 Suchowski (1995) discloses a break away receptacle buckle with an interior rounded tongue snap portion engageable with a corresponding rounded forked element. Again when used in a cat collar, the buckle would tend to bind when subjected to a twisting movement making it more difficult for a cat to escape.

U.S. Pat. No. 5,450,820 Kirsch (1995) discloses a quick release dog collar using a plug and socket break-away connector. The tension at which break away occurs can be adjusted. The connector is attached by rings to looped ends of the collar. The rings are free to slide in the collar ends reducing the tendency of the connector to open when a twisting force is exerted. The large round connector could also exert an uncomfortable pressure on the sensitive underside of a dogs neck.

There are also notched flea collars for cats on the market designed to break at the notch.

ITW Nexus manufactures the Break-away Clip. The Break-away Clip is used to attach suspenders for back support belts. The Break-away Clip replaces the hook and loop fastener which has different strength characteristics depending upon which way it is pulled.

SUMMARY OF THE INVENTION

The present invention is directed to a dog collar having a smooth, comfortable break-away clip which will open when a twisting force is exerted or when the collar is placed under tension. Unlike a hook-and-loop fastener, the break-away tension or torque of the clip of the present invention is relatively constant. A hook-and-loop fastener has a very high break-away tension when twisted.

The break-away dog collar of the present invention has a flat, flexible, neck-encircling strap, two ends of which are joined by a break-away clip. The strap can be made of leather, rubber, plastic, woven material or any other material used for dog collars. An elongated rod positioned parallel to widthwise direction of the strap is attached one end of the strap. The rod is preferably circular in cross section, but can any curved cross sectional configuration. The mating part of the clip has at least two independent elongated posts attached to a base and aligned parallel to the rod. An opposing hook attached to the base opposes the posts and partially encircles the rod. The posts and/or the hook are resilient. The space on the base between posts and the hook is aligned parallel to the widthwise dimension of the strap to allow for insertion of the rod attached to the other end of the strap between the posts and the hook. The hook has a projection on its inner side adjacent to its free end defining a restricted entrance for the rod and wedgingly engagable by the rod to spring the rods and or the hook outwardly for reception of the rod between the projection and the base when the rod is moved into a recess formed by the posts and the hook. The projection is wedgingly disengagable by the rod upon excessive movement of the rod away from the parallel alignment with the space between the hook and the posts caused by stress on the neck-encircling strap. Strain caused by the stress sufficient to overcome the resilience of the hook and/or posts opens the clip and allows the collar to break free. After the break-away-clip opens to free the pet, it can easily be snapped back together for reuse.

The base, from which the posts and the hook protrude, can be attached to an end of the strap by a sewable tab extending from the base or by a retainer which has an opening for the strap to pass through.

The purpose of the break-away collar is to prevent a dog from becoming ensnared by its collar. Even when attended, pets often become ensnared. A dog can be seriously injured in attempting to fee itself such as by the collar twisting and cutting the blood supply to the brain, strangulation, impact, cutting or related injuries, and serious fright. If a dog cannot free itself, it can be trapped and starved, never to be found. It is desirable to prevent the break-away clip from opening while a dog is on a leash. To prevent the break-away dog collar from opening when the dog is on a leash, one D ring is positioned at one end of the strap adjacent one side of the break away clip and a second D ring is positioned at the other end to the strap adjacent the other end of the break-away clip. The attachment of a leash to two D rings to prevent a hook and loop fastener from opening is shown in FIGS. 1 and 2 of U.S. Pat. No. 4,426,957 the disclosure of which is hereby incorporated by reference. A leash can be attached through both D rings and thereby prevent the break-away clip from opening.

Various sized break-away clips having various break away tensions can be designed for various sized dogs and other animals, such as cats. It is preferable that the break-away clip be separable upon the application of tension equal to of from 25% to 75% of the weight of the pet. The tension can be generated by torque on the base of one of the posts in the case of a twisting force causing the collar to act as a tourniquet.

BRIEF DESCRIPTION OF THE PREFERRED EMBODIMENTS

The present invention is directed to a safety collar for a dog which is releasable if caught on a protrusion or twisted by another dog in a fight or aggressive play, or by the dog trying to release itself from the protrusion. Release of the collar prevents strangulation or the dog being trapped away from home.

Figure 1:
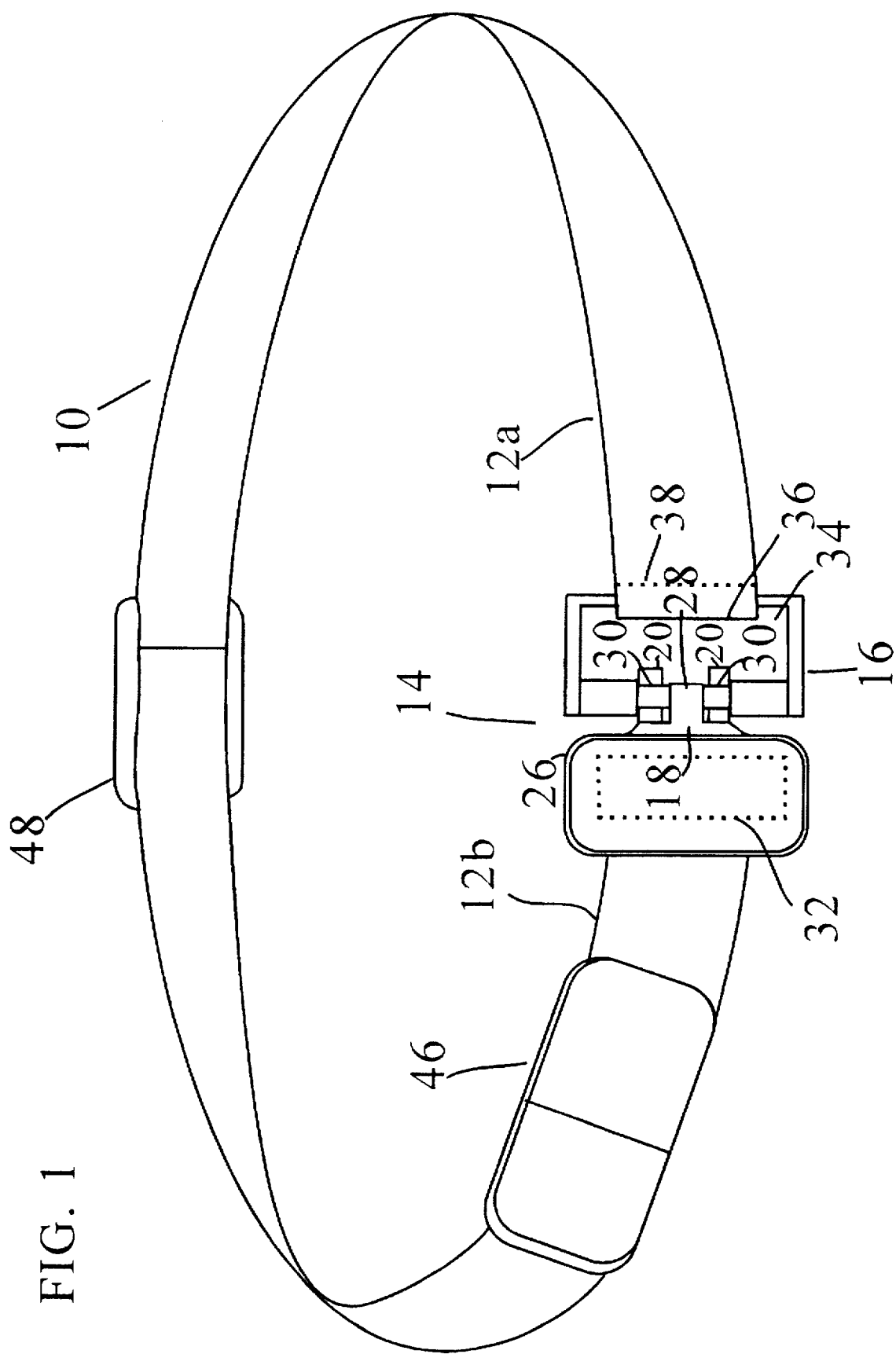
FIG. 1 is a perspective view of the break-away clip containing collar of the present invention.
Figure 2:
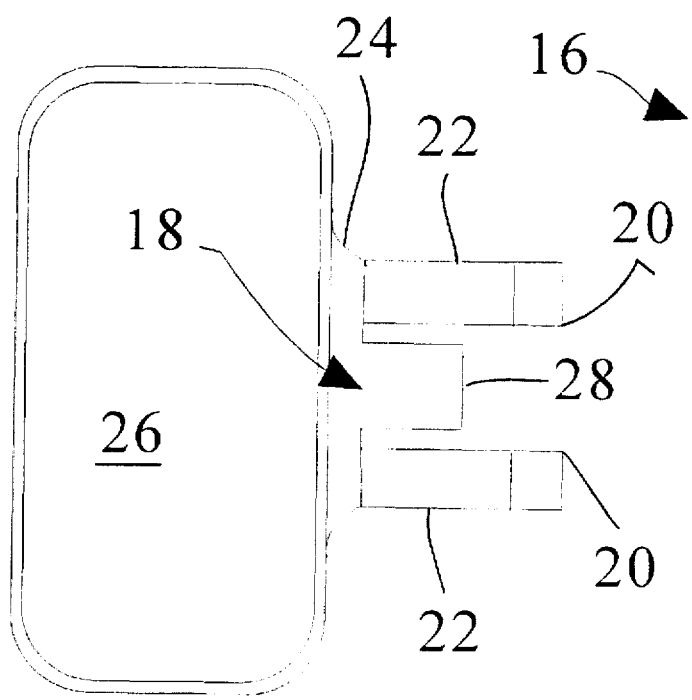
FIG. 2 is a top view of the post and hook half of the break-away clip.
Figure 3:
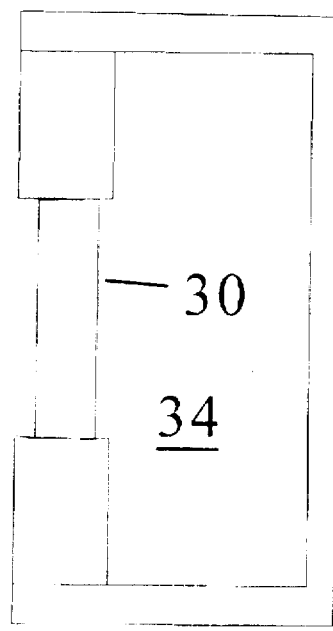
FIG. 3 is a top view of rod containing half of the break away clip.
Figure 4:
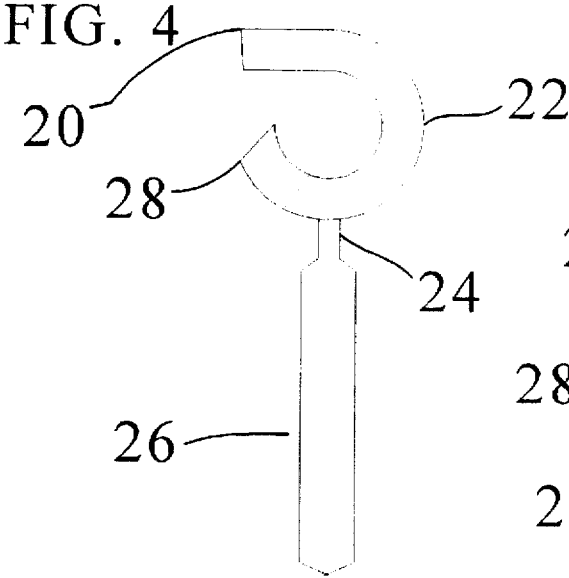
FIG. 4 is a side sectional view of the posts and hook half of the clip.
Figure 5:
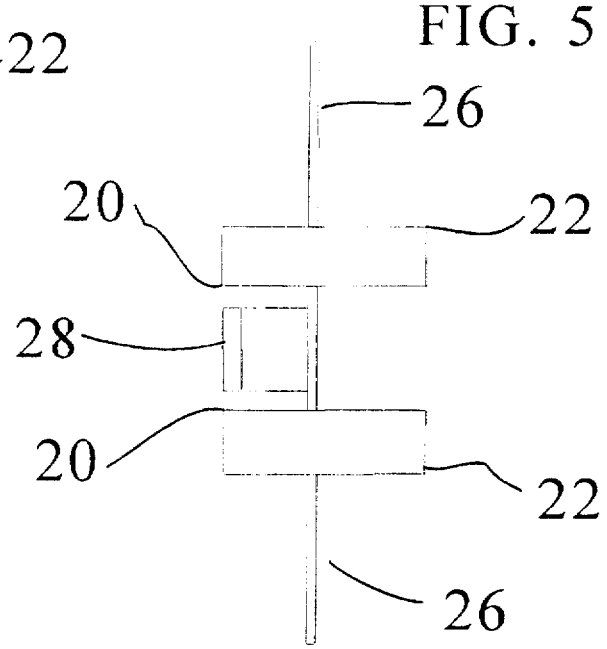
FIG. 5 is an end sectional view of the posts and hook half of the break away clip.

The collar 10 includes straps 12a and 12 b attached at each end to break-away clip 14. Break away clip 14 includes rod portion 16 and posts and hook portion 18. The posts and hook portion 18, as shown in FIGS. 2, 4 and 5 includes resilient posts 20 which terminate in a U shaped channels 22 which channels 22 are joined to an extension 24 of tab 26 of the posts and hook portion 18. Also joined to extension 24 is resilient hook 28 which is spaced from posts 20 a sufficient distance for the insertion of a rod 30 of rod portion 16 between the resilient posts 20 and the resilient hook 28. Tab 26 is a thin sheet of plastic which is sewn to strap 12b by stitches 32. The rod 30 fits snugly between posts 20 and hook 28 as is shown in FIG. 1. The rod portion 16 contains a slot 34 through which a strap end 36 can pass is a conventional manner. The strap end 36 of strap 12b is then overlapped and stitched with stitching 38 near to the slot 34 to prevent the strap 12b from sliding in the slot 34 when the collar is twisted due to entanglement. Twisting causes the break away clip 14 to open and free the dog when the collar 10 is entangled. Straight tension also opens the break away clip 14.

Figure 6:
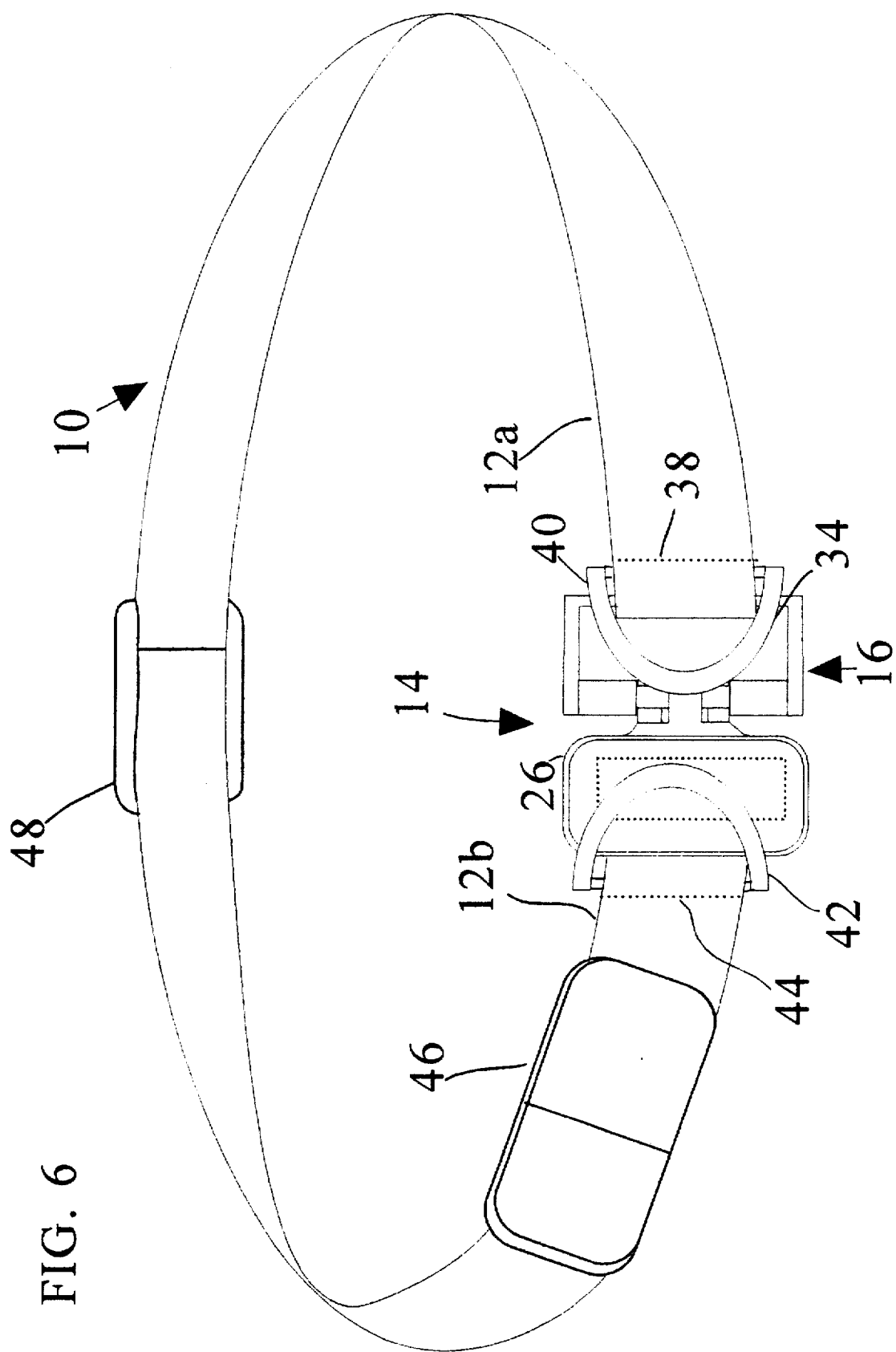
FIG. 6 shows a D ring on each side of the break-away clip to prevent the clip from opening while the pet is on a leash.

As is shown in FIG. 6 a D ring 40 can be incorporated next to the slot 34 prior to the addition of stitches 38 to provide a closure for the break-away clip 14 to prevent the break-away clip from opening while the dog is on a leash. A second D ring 42 is attached to strap 12b adjacent to posts and hook portion 18 by stitches 44 which hold overlapped portions of strap 12b together.

The dog collar 10 has a conventional snap buckle 46 and belt length adjuster 48 joined in a conventional configuration with collar strap 12a.

To attach a leash to the break-away collar 10 and deactivate the break away clip 14, a conventional leash clasp (not shown) is passed through both D rings 40 and 42.

The break-away clip 14 is commercially available from ITW Nexus, an Illinois Tool Works Company, 230 W. Gerry Dr., Wood Dale, Ill. 60191. The break-away clip 14 is made from a resilient plastic.

The buckle 44 can be eliminated and the collar 10 put on and taken off using the break away clip 14 but this is not preferred. Repeated opening and closing of the break-away clip 14 can reduce the force or torsion required to open the-break-away clip 14. The break-away clip 14 can be manufactured in different sizes and at different break-away tensions for different sized dogs.

I claim:

1. A collar for a pet comprising a longitudinally extending collar strap having a first end and a second end,
a break-away clip connecting the first end with the second end, said clip being separable upon the application of tension equal to of from 25% to 75% of the weight of the pet,
one end of the clip comprising a rod positioned perpendicular to the longitudinal direction of the strap,
the second end of the clip comprising a row of two or more resilient posts aligned perpendicular to the longitudinal direction of the strap on a base of the clip, and a resilient hook positioned between the row of posts and spaced from the row at the base by a distance equal to the diameter of the rod,
the hook having a projection on the side facing the posts defining a restricted entrance for the rod.

2. A collar for an animal having a break-away clip positioned between two ends of a collar strap comprising one half of the clip having an elongated rod positioned parallel to the widthwise direction of the strap and attached one end of the strap, and the other end of the clip comprising at least two posts and at least one elongated hook, the posts and/or the hook being resilient, the posts opposing the hook which partially encircles the rod, the rods aligned parallel to the rod attached to the other end of the strap, the hook having a projection on its inner side adjacent to the rods defining a restricted entrance for the rod and wedgingly engagable by the rod to spring the hook outwardly for positioning of the projection in an engagable holding relationship behind the rod when the rod is moved into a recess formed between the hook and the posts, and the projection being wedgingly disengagable by the rod upon excessive movement away from the parallel alignment of the space between the posts and the hook with respect to the rod effected by stress on the neck-encircling strap circumferentially threreof sufficient to overcome the resilience of the hook and/or the rods allowing the collar to open and the animal to escape from the collar.

3. The collar of claim 2 wherein the posts and the hook are attached to the other end of the strap by a tab extending from the posts and the hook.

4. The collar of claim 3 wherein the tab is sewn to the strap.

5. The collar of claim 2 wherein one D ring is positioned at one end of the strap adjacent the break away clip and a second D ring is positioned at the other end to the strap adjacent the break-away clip so that a leash can be attached through both D rings and prevent the break-away clip from opening while a dog is on the leash.

6. A break-away dog collar comprising a flat, flexible, neck-encircling strap containing a break-away clip, one half of the clip comprising an elongated rod, positioned parallel to widthwise direction of the strap and attached to a first end of the strap, and the other half of the clip comprising at least two independent elongated posts, and an opposing hook having an inner side and a free end, opposing the posts and partially encircling the rod, the posts and/or the hook being resilient, a space between the posts and the hook aligned parallel to the widthwise dimension of the strap for insertion of the rod attached to a second end of the strap, the hook having a projection on its inner side adjacent to its free end defining restricted entrance for the rod and wedgingly engagable by the rod to spring the posts and or the hook outwardly for reception of the projection behind the rod when the rod is moved into a recess formed by the posts and the hook, and the projection being wedgingly engagable by the rod upon excessive movement of the rod away from parallel alignment of the rod and the space between the posts and the hook effected by stress on the neck-encircling strap circumferentially thereof sufficient to overcome the resilience of the hook or posts to allow the rod to be released an allow the dog to escape from its ensnared collar.

7. The break-away dog collar of claim 6 wherein the posts and the hook are attached to the other end of the strap by a tab extending from the hooks.

8. The break-away dog collar of claim 7 wherein the tab is sewn to the strap.

9. The break away dog collar of claim 6 wherein one D ring is positioned at one end of the strap adjacent the break away clip and a second D ring is positioned at the other end to the strap adjacent the break-away clip so that a leash can be attached through both D rings and prevent the break-away clip from opening while a dog is on the leash.

* * * * *